Jan. 26, 1965     H. T. WEISBRICH, JR     3,167,652

MISS DISTANCE AND VECTOR MEASUREMENT SYSTEM

Filed Oct. 3, 1961

*INVENTOR.*
HENRY T. WEISBRICH, JR.

BY

*P. H. Firsht*

ATTORNEY.

United States Patent Office 3,167,652
Patented Jan. 26, 1965

3,167,652
MISS DISTANCE AND VECTOR MEASUREMENT SYSTEM
Henry T. Weisbrich, Jr., 905-B Richmond,
China Lake, Calif.
Filed Oct. 3, 1961, Ser. No. 142,743
8 Claims. (Cl. 250—71.5)
(Granted under Title 35, U.S. Code (1952), sec. 266)

The invention herein described may be manufactured and used by or for the Government of the United States of America for governmental purposes without the payment of any royalties thereon or therefor.

The present invention relates to a telemetering instrumentation system, and more particularly to system for obtaining miss distance, trajectory and vector information of a test missile.

Information of the type desired may be obtained by electromagnetic interferometer systems and multiple camera systems. However, such systems are expensive, complex and their operation and maintenance are quite involved.

It is therefore an object of the present invention to provide a system which is economical, simple and compact for obtaining miss distance and trajectory information of a missile.

Another object is the provision of a system which generates analog and time signals from which the relative positions of missile and target may be determined.

In one aspect of the present invention, the missile is provided with a source of radiation and the target carries a rotating reticle and scintillometer for generating the analog signals and a pulse generator for the time signals.

Other objects, features and many of the attendant advantages of this invention will become readily appreciated as the same become better understood by reference to the following detailed description when considered in conjunction with the accompanying drawings wherein.

Figure 1:
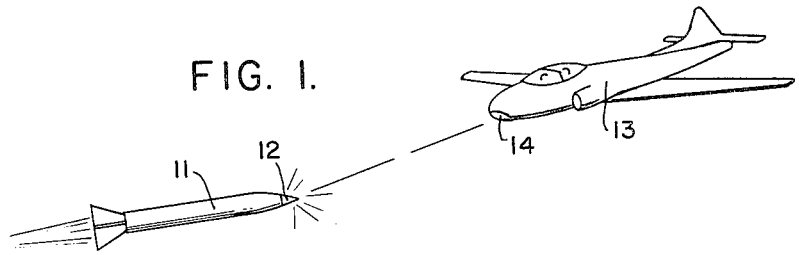
FIG. 1 is a view schematically illustrating the system of the present invention.
Figure 2:
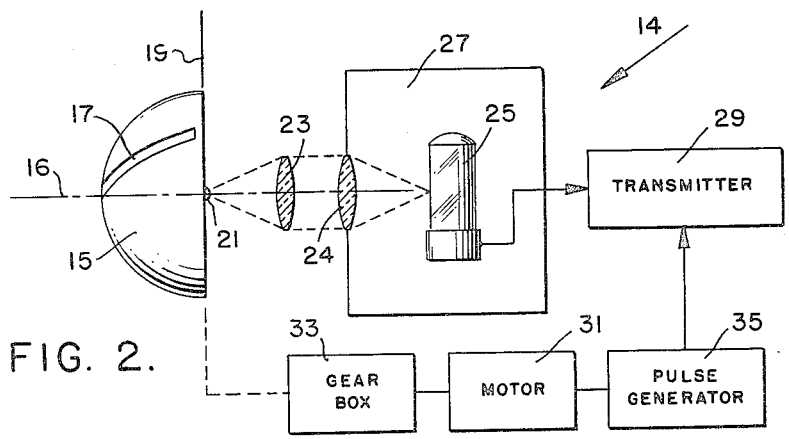
FIG. 2 is a schematic view of the sensing and timing means for generating analog and time signals.
Figure 3:
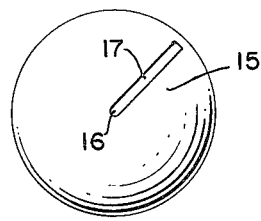
FIG. 3 is a front elevation of the reticle showing the window therein.

Referring now to the drawings, wherein like reference numerals designate like or corresponding parts throughout the several views, there is shown in FIG. 1 a missile 11, carrying a source of gamma radiation 12, and a target aircraft 13 carrying a radiation sensing and timing device 14 forming the heart of the miss distance and vector measuring system of this invention. FIG. 2 schematically illustrates the sensor and timer device 14 which comprises an arcuate member 15 having the form of a portion of a spheroid, suitably mounted for rotation about axis 16 of the spheroid. Member 15 is opaque to gamma radiation but is provided with a slot or window 17 which is covered to light but is open or transparent to gamma radiation, the slot or window being of uniform width and lying in a plane defined by axis 16 and a diameter of the spheroid, FIG. 3.

On the axis 16, and generally in a plane perpendicular thereto passing through line 19, is an amount of radiation sensitive material 21, such as sodium iodide or the like. Scintillations emitted by the material 21 when excited by gamma radiation are gathered by a collimating lens 23 located on axis 16 and directed through a focusing lens 24 to a photomultiplier tube 25 forming part of a scintillometer 27 which generates an analog signal, the scintillometer being suitably connected to a transmitter 29 for transmitting the analog signals. Suitable means, for example, a motor 31 and gearbox 33, are provided for rotating the member or reticle 15 at suitable speed or frequency. Also connected to the rotating means 31 is a pulse generator or the like 35 which is suitably connected to the transmitter 29 for transmitting a time pulse signal indicative of the rotational position of rotatable member 15 and its window 17. Device 14 is housed in a casing or pod suitably supported on the target aircraft 13.

Figure 4:
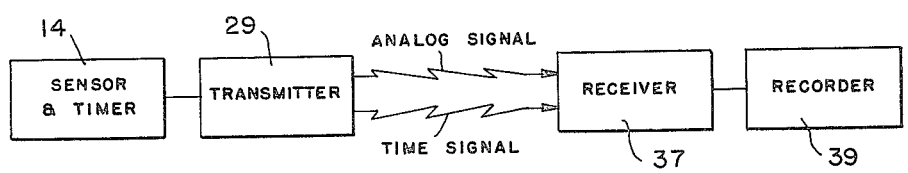
FIG. 4 is a block diagram schematically illustrating the relationship between essential parts of the system.

The transmitter 29 transmits the analog and time signals as they occur to a receiver 37 on the ground which is suitably connected to a recorder 39 for recording the miss distance and vector information, FIG. 4. Reduction of the information record provides data on miss distance, trajectory and vector quantities.

It is to be noted that although the speed of rotation of reticle 15 is constant, the duration or amount of time the scintillation material 21 is exposed to gamma radiation from source 12 will vary depending upon where a ray from the source to the material passes through the window 17. For example, when the gamma radiation source 12 is on the axis 16 the material 21 is constantly exposed to radiation, whereas when the source is at an angle thereto and a ray from the source passes through window 17 near the peripheral edge of reticle 15 the material will be exposed to the radiation only for a brief instant. Thus, the analog signals generated by scintillations detected during rotation of the window will have a time characteristic proportional to the angular displacement of the source off the axis of the reticle and the time width of the analog signal will be indicative of the angle the ray from the source to the material makes with the rotational axis of the reticle. Also, since with any position of the source off of axis 16 the radiation therefrom may pass to the material 21 only when window 17 is properly aligned, correlation of the analog signal with the time pulse signal determines the rotational position of the window and defines the plane containing the ray from the source to the material. The level or amplitude of the analog signal will vary with distance of the radiation from the scintillometer and the amplitudes thus provide the data for determining the miss distance. It is understood, of course, that the system will be calibrated as to amplitude sensitivity, rotational speed of the reticle, and analog signal duration for the angular position of the source off the reticle axis.

Figure 5:
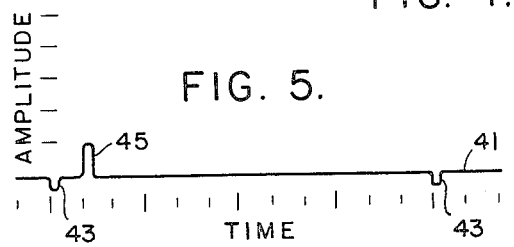
FIGS. 5 and 6 are exemplary illustrations of the recorded information.
Figure 6:
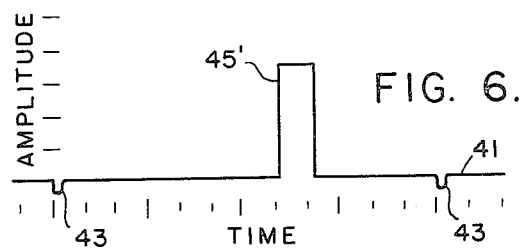

Turning now to FIGS. 5 and 6, which are representative examples of the information record, there is shown a continuous wave 41 upon which time pulses 43 are impressed at periodic intervals of time. Also, impressed on the wave 41 are the analog signals 45, 45' which occur as scintillations are detected. In FIG. 5, the analog signal 45 is shown as occurring in the first quarter or quadrant following the time pulse, while in FIG. 6 the analog signal 45' is shown as occurring in the third quadrant. Further comparing signals 45 and 45', it is to be noted that the former is of lesser amplitude and time width than the latter which indicates that at the time of signal 45 the missile was at greater distance from the target aircraft than at the time of signal 45' and the ray of radiation at the time of signal 45 was closer to the peripheral edge of the reticle than the ray at the time of signal 45'.

In use, the device of FIG. 2 is mounted on a target aircraft at which a missile carrying a suitable source of radiation, for example, gamma radiation, will be directed. During the flight of the missile toward the target, reticle 15 is rotated and radiation from the source passes through the slot or window 17 and impinges on the radiation sensitive scintillation material 21, thereby exciting the same and causing scintillations to be emitted. Collimating lens 23 gathers the emitted scintillations and directs them through lens 24 to photomultiplier tube 25, thus producing an analog signal which is transmitted by transmitter 29 to the receiver 37. Pulse generator 35 periodically emits a time pulse signal which is indicative of the rotational position of reticle 15 and which signal is also transmitted by transmitter 29 to the receiver 37.

Thus, the instant invention provides a miss distance and vector measurement system which is economical, simple and compact.

Obviously many modifications and variations of the present invention are possible in the light of the above teachings. It is therefore to be understood that within the scope of the appended claims the invention may be practiced otherwise than as specifically described.

What is claimed is:

1. A system for determining the miss distance between two relatively movable objects, comprising a source of radiation on one of said objects, a radiation detection device on the other of said objects, said device including an amount of scintillation material adapted to emit scintallations when exposed to said radiation, a reticle disposed between said source of radiation and said material and adapted to be rotated about an axis, said reticle being a spheroid form and opaque to said radiation but having a narrow radial slot of uniform width therein adapted to adapted to pass radiation to the material when aligned therewith, means for periodically pulsing a time signal correlated to the rotational position of said slot, and means adapted to convert said scintillations into transmittable signals which correlated with said time signals are indicative of the direction and distance of the source of radiation from the radiation detection device.

2. The system of claim 1, in which said last-named means comprises a collimating lens and a photomultiplier tube.

3. The system of claim 1, further comprising means for transmitting both types of signals as they occur, and means for receiving said signals and recording the same.

4. In a system for determining the miss distance between a target and a missile which is directed at the target and carries a source of radiation, a radiation sensing device carried by said target and comprising an amount of material adapted to emit scintillations when exposed to said radiation, an opaque reticle of arcuate form disposed between said material and said radiation source and adapted to be rotated about a rotational axis, said reticle being disposed symmetrically with respect to said rotational axis and having a narrow slot of uniform width therein extending radially from said rotational axis and adapted to pass radiation from said source to said material when in alignment therewith, means for generating a pulsed signal for each revolution of said slot, and means for converting said scintillations into analog signals which correlated with said pulsed signals are indicative of the direction and distance of said missile from said target.

5. In the system of claim 4, said arcuate form comprising a spheroid.

6. In a system for determining the relative positions of two objects movable toward each other, a source of radiation carried by one of said objects, radiation detection and timing means carried by the other of said objects, said means comprising an amount of material adapted to emit scintillations when exposed to said radiation, an opaque reticle disposed between said material and said radiation and adapted to be rotated about a rotational axis, said reticle being of arcuate form symmetrical with respect to said rotational axis and having a narrow slot of uniform width therein, said slot having an axis lying in a plane passing through said rotational axis whereby said material is exposed to said radiation and scintillations are emitted when said slot passes a ray from said source of radiation to said material, means for converting said scintillations into analog signals, and said radiation detection and timing means also including means for periodically pulsing a time signal correlated to the rotational position of said slot; whereby the relation of the analog signal to the time signal will be indicative of the rotational position of the slot and of the plane containing the passed ray of radiation, the time width of the analog signal will be indicative of the angle said ray makes with the rotational axis of the reticle, and the amplitude of the analog signal will be indicative of the distance between the material and the source of radiation.

7. A system for obtaining miss distance and trajectory information of a target and a missile directed thereat comprising, a source of radiation, a radiation sensing and timing device, in combination, said device including means for periodically pulsing a time signal and for detecting said radiation and generating an analog signal indicative of such detection, said means including a rotatable reticle of dished shape and having a narrow radial slot of uniform width therein for passing radiation from said source to said device, said time signals being correlated to the rotational position of said slot, and said analog signals being correlated to said time signals and indicative of the direction and distance of said source of radiation from said radiation sensing and timing means.

8. A radiation detection device determinative of the distance and direction of a source of radiation, said device comprising a reticle rotatable about a rotational axis, said reticle having a dished shape disposed symmetrically with respect to said axis, said reticle formed with a narrow slot of uniform width extending radially from said rotational axis, an amount of material located on said rotational axis and adapted to emit scintillations when exposed to radiation, said slot adapted to pass radiation to said material when aligned iwth the material and a source of radiation, and means for gathering said scintillations and converting them into analog signals.

References Cited by the Examiner

UNITED STATES PATENTS

| | | | |
|---|---|---|---|
| 1,948,552 | 2/34 | Weber et al. | 250—106 |
| 2,420,509 | 5/47 | Whittaker | 244—14 |
| 2,812,427 | 11/57 | Magondeaux | 250—406 |
| 2,955,778 | 10/60 | Beveridge | 343—5 |
| 2,992,330 | 7/61 | Cooper et al. | 250—106 |
| 2,992,422 | 7/61 | Hayes | 343—5 |
| 3,004,258 | 10/61 | Cohen et al. | 250—106 |
| 3,038,996 | 6/62 | Grube | 250—83.3 |
| 3,091,463 | 5/63 | Cohen et al. | 250—71.5 |

OTHER REFERENCES

"New Age" Comic Section, published in the Washington Post for February 19, 1961.

RALPH G. NILSON, *Primary Examiner.*

ARCHIE R. BORCHELT, *Examiner.*